United States Patent [19]
Habig et al.

[11] Patent Number: 4,673,081
[45] Date of Patent: Jun. 16, 1987

[54] WASTE OIL DRAIN COLLECTOR AND STORAGE CONTAINER KIT

[75] Inventors: Peter C. Habig, 79 Division Ave., Summit, N.J. 07901; Ronald R. Daugherty, Washington, N.J.

[73] Assignee: Peter C. Habig, Summit, N.J.

[21] Appl. No.: 879,849

[22] Filed: Jun. 27, 1986

Related U.S. Application Data

[63] Continuation of Ser. No. 801,221, Nov. 25, 1985, abandoned.

[51] Int. Cl.$^4$ .......................... B65D 25/42; B65B 3/04
[52] U.S. Cl. .................................. 206/223; 220/1 C; 141/98; 184/106; 222/484
[58] Field of Search ................ 206/223, 577, 376-378; 220/1 C; 141/98, 104, 248, 334; 222/484; 184/106, 1.5

[56] References Cited

U.S. PATENT DOCUMENTS

| | | | |
|---|---|---|---|
| Re. 27,449 | 8/1972 | Bartz | 141/1 C |
| 172,341 | 1/1976 | Pfeifer | 210/477 |
| 1,554,589 | 9/1965 | Long | 184/1.5 |
| 2,405,681 | 8/1946 | Woock | 222/484 |
| 3,223,296 | 12/1965 | Waddington et al. | 222/484 |
| 3,410,438 | 11/1968 | Bartz | 220/1 C |
| 4,010,863 | 3/1977 | Ebel . | |
| 4,054,184 | 10/1977 | Marcinko . | |
| 4,114,660 | 9/1978 | Arruda | 184/106 |
| 4,149,575 | 4/1979 | Fisher | 141/98 |
| 4,296,838 | 10/1981 | Cohen | 206/223 |
| 4,301,841 | 11/1981 | Sandow | 220/1 C |
| 4,488,584 | 12/1984 | Hestehare et al. | 220/1 C |
| 4,513,865 | 4/1985 | Melzi et al. | 220/1 C |
| 4,524,866 | 6/1985 | Pollacco | 220/1 C |
| 4,533,042 | 8/1985 | Pollacco | 206/223 |
| 4,557,395 | 12/1985 | DeLay, Jr. | 141/98 |

Primary Examiner—William Price
Assistant Examiner—Brenda J. Ehrhardt
Attorney, Agent, or Firm—Martha G. Pugh

[57] ABSTRACT

A waste oil drain collector and storage container kit for collecting and storing waste fluid, such as oil, drained from the engine of motor vehicles. A disclosed embodiment comprises a rectangular receptacle, which, in oil collecting position rests on a broad, flat base, supporting a drain pan in the uppermost position. A lid is designed to cover the drain pan when the receptacle is placed on end with a handle uppermost, in carrying position. A particular feature of the receptacle is a cylindrical valve which is manually rotated through three positions, a first collecting position which opens a passage from the oil drain pan to a storage container; a second pouring position which closes the passage to the storage container from the oil drain pan and opens a passage from the storage container to an external dispensing spout; and a third carrying position in which the passages into and out of the storage container are closed, and a cap is screwed in place on the dispensing spout. Another feature is the use of the internal surface of the drain pan lid as a caddy for carrying tools for opening the oil cock and loosening the oil filter.

7 Claims, 20 Drawing Figures

WASTE OIL DRAIN COLLECTOR AND STORAGE CONTAINER KIT

This application is a continuation of application Ser. No. 801,221, filed 11/25/85, now abandoned.

BACKGROUND OF THE INVENTION

This relates in general to a receptacle for collecting and storing waste fluid, more particularly oil, drained from the engines of motor vehicles.

Many persons desire to avoid expense by changing the oil in their own vehicles. When this is carried out in a residential garage or driveway, the problem arises of how to properly dispose of the spent oil by collecting it in a suitable receptacle for carrying to a reprocessing or disposal center, in a manner to avoid spilling the oily contents and contaminating the car trunk or other carrying facility with oil. Further problems arise during each operation in subsequently assembling the necessary tools, and in cleaning up and storing the oily drain pan and tools after the oil draining operation has been completed.

In the prior art, drip receptacles have been available, in the form disclosed in U.S. Pat. No. 3,410,438, issued to R. O. Bartz on Nov. 12, 1968. However, this device has several disadvantages. When the receptacle is upended in carrying positions, the laterally-disposed drip pan is open, and must be cleaned up after each operation, to avoid contaminating the surroundings. Further, in order to close the drain which allows the oil to seep from the drain pan into the storage container to keep oil from slopping out when the receptacle is in upended carrying position, it is necessary to reach through the drain opening and manually apply a screw-on cap to the screw-threaded neck projecting into the storage container from the drain. Further, when the container is in carrying position, the oil is poured out through a spout which is closed with a separate screw-cap. Tools for opening and closing the oil drain cock, and for removing the engine oil filter must be assembled for each operation and separately cleaned up and put away thereafter.

BRIEF DESCRIPTION OF THE INVENTION

It is therefore the principal object of the invention to provide an improved waste oil drain collector and storage container kit which is an improvement over drip receptacles of the type disclosed by the prior art, in that it is more convenient to use and store. Another object of the invention is to provide an oil-change kit which is easy to assemble during the oil draining procedure, and requires substantially no clean-up after the oil drain procedure has been completed.

Another object of the invention is to provide a waste oil drain collector kit having a single valve system which is set to open, closed and pour-out positions, and a single set of standard tools for removing and replacing the engine oil cock and oil filter are provided with the kit.

These and other objects of the invention are provided by a combination waste oil drain collector and storage kit, having a unique cylindrical rotary valve system, and including a caddy for tools. The combination waste oil drain collector and storage kit of the present invention comprises, in one embodiment, a rectangular receptacle having one pair of broad sides, including a flat base which supports the receptacle in collecting position. The broad sides are bounded by two pairs of substantially narrower sides, one of which serves as the resting base for carrying position of the receptacle, the side opposite the resting base supporting a handle. The rectangular receptacle includes a storage container, one wall of which is formed by a drain pan mounted internally opposite the broad collection support base, supported by the two pairs of narrow sides.

The drain pan includes a concavity which slopes inward towards a nadir near one corner adjacent the handle. A conduit is interposed through the side wall of the receptacle, leading to an external opening. The connecting conduit has openings at its inner end near the nadir area and has lateral internal openings for receiving oil into and dispensing oil from the storage area. A manually operated cylindrical rotary valve and pour-out spout combination which fits telescopically into the conduit, has three positions:

a first carrying position in which the openings from the collecting pan area into the storage container, and from the storage container into the external pour-out spout are all closed for carrying purposes;

a second collecting position in which the openings for admitting oil from the drain pan into the storage container are uncovered, and the openings from the storage container into the external pour-out spout are closed; and a third pour-out position in which the openings from the collecting pan into the storage container are closed, and the openings from the storage container into the external pour-out spout are opened for dispensing oil from the storage container. The pour-out spout terminal of the rotary valve member is screw-threaded to receive a cap.

A further part of Applicant's kit is a closure which snap-fits in liquid-tight relation completely covering the oil drain pan for carrying the receptacle in its upended position. The underside of the closure comprises snap-fit holders into which are fitted a pair of wrenches, one of which serves to open and close the oil drain cock, and the other of which serves to loosen the oil filter prior to removal.

SHORT DESCRIPTION OF THE DRAWINGS

These, and other objects, features and advantages of the present invention will be apparent from a detailed study of the specification and drawings hereinafter.

FIGS. 12A, 12B and 12C show the valve assembly of the present invention disposed in carrying position, the valve being rotated in an extreme clockwise direction to engage a stop.

FIGS. 13A, 13B, and 13C show the valve assembly of the present invention with the valve rotated counterclockwise about 150 degrees from the position of FIGS. 12A, 12, and 12C to the position for collecting oil in the drain pan, and draining the collected oil into the storage container.

FIGS. 14A, 14B, and 14C show the valve assembly of the present invention, disposed in pour-out position, the valve being rotated in an extreme counterclockwise direction about 150 degrees from the position of 13A, to engage a stop.

DETAILED DESCRIPTION OF INVENTION

Figure 1:
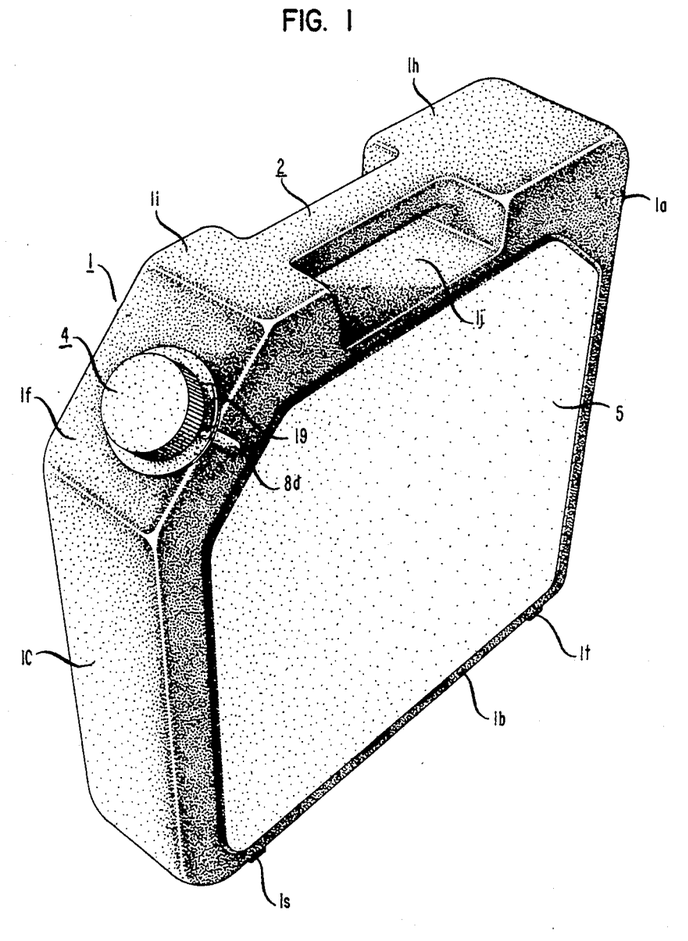
FIG. 1 is a perspective view of the waste oil drain receptacle of the present invention in carrying position standing on the carrying rest base with the closed pour-out spout and carrying handle on the upper end, and the drain pan lid in place.
Figure 3:
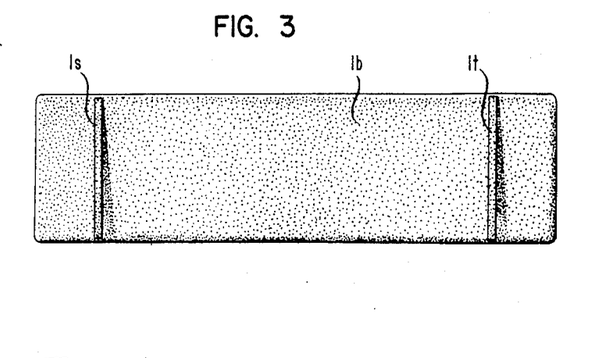
FIG. 3 is a view of the carrying rest base of the waste oil drain receptacle of the present invention.

Referring in detail to FIG. 1, there is shown the waste oil drain container and storage kit of the present invention comprising a receptacle in closed carrying position. It is contemplated that the receptacle can be formed of any rigid material, such as rigid plastic, or metal. The preferred embodiment, described by way of illustration, is formed of blow-molded or rotationally molded, high density polypropylene plastic, 1/16 inch thick. A preferred embodiment, in carrying position, as shown in FIG. 1, has an overall height of 17½ inches to the top of the rear end panel 1a, which is substantially flat and rectangular in shape, and, say, 5¼ inches in overall width along the base panel 1b, which is also substantially flat and rectangular in shape as shown in FIG. 3.

The resting base member 1b for the carrying position has a pair of support members 1s and 1t, which are strips of plastic, ¼ inch wide, and say, ¼ inch thick, and 3½ to 4¾ inches long, placed transversely across the base, 2 inches in from the opposite ends of base 1b.

Referring to FIG. 1, the forward end panel 1c, which is opposite and parallel to 1a, is substantially flat and rectangular, 13½ inches high and 4¾ inches wide. At the upper end of panel 1c, and beveled inwardly extending 5½ inches upward at approximately a 45 degree angle from panel 1c, is the panel 1f, which is also rectangular, and 4¾ inches wide. Centered near the inside edge of panel 1f is a spout covered by the shallow cylindrical cap 4 which is 2¼ inches in diameter and bounded by an inwardly-directed, fluted annular sidewall 5/9 inches wide.

The angularly disposed panel 1f terminates at the top of the receptacle as shown in FIG. 1, in a rectangular shoulder 1i and extends 2¼ inches along the top.

Another rectangular shoulder 1h extends 5 inches along the top. Both shoulders are 4¾ inches wide, and are separated by a rectangular depression 5½ inches long, and 4¾ inches wide. The two shoulders 1i and 1h are connected by a centered handle 2 which is 5½ inches long, and 1¾ inches wide, and about ¾ inch thick, the top of which is flush with the surfaces of the shoulders 1i and 1h.

Figure 2:
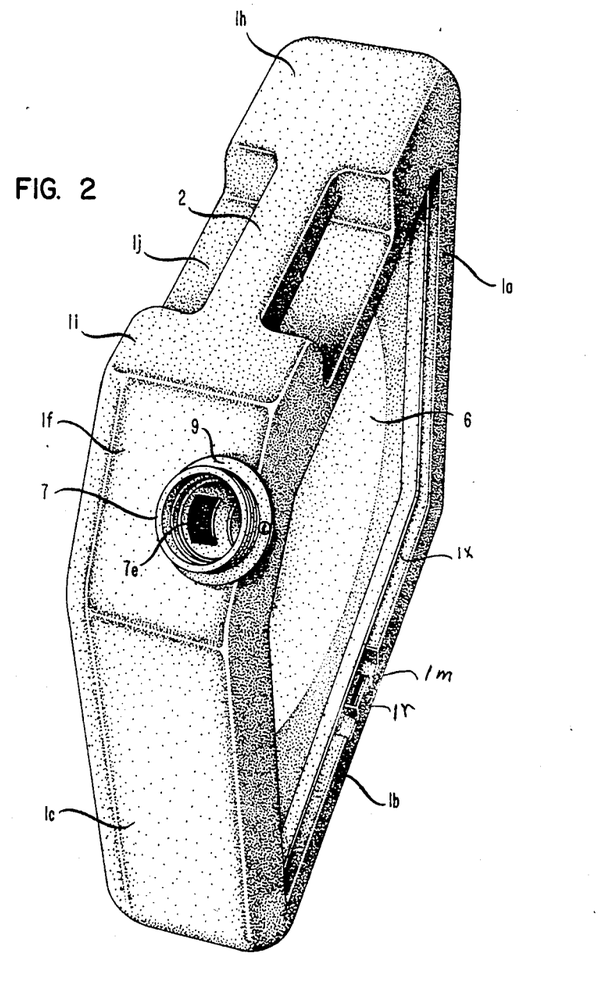
FIG. 2 is a perspective view of the waste oil receptacle of the present invention standing on the carrying rest base, the cylindrical rotary valve terminating in an open spout, with the lid removed, and the drain pan closure removed to expose the drain pan.

FIG. 2 shows one of the broad sides of the receptacle of FIG. 1, with the lid or cover 5 removed, exposing the drain pan 6, which will be described in greater detail with reference to FIG. 4.

Figure 5:
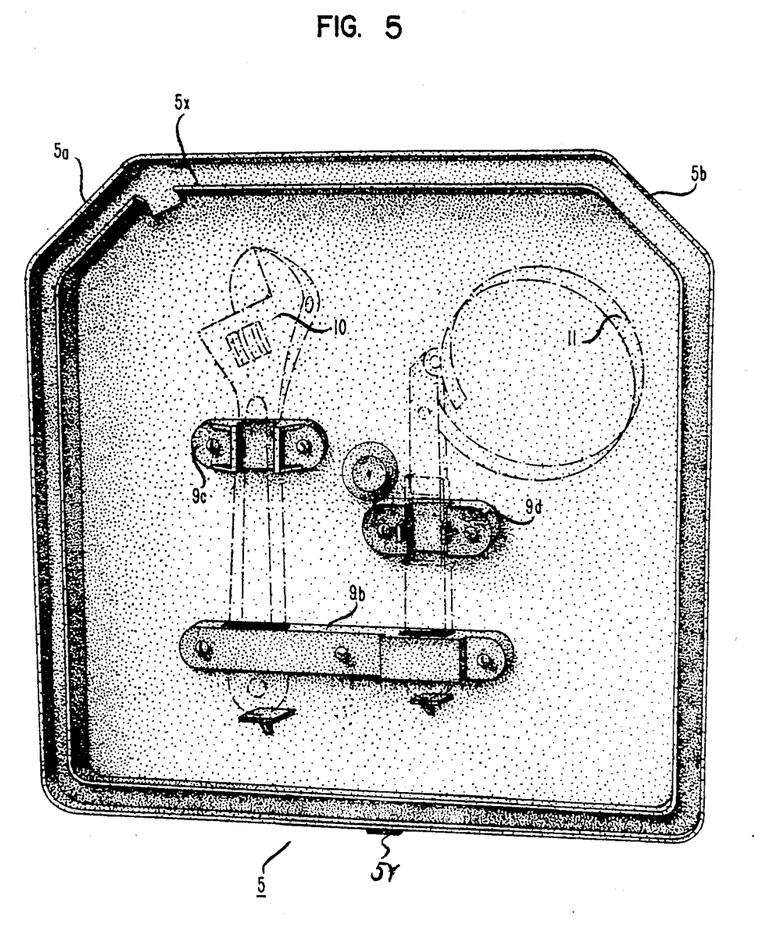
FIG. 5 is a view of the underside of the removed drain pan lid of FIG. 1, showing the tool holders, in which tools are shown in phantom, as not being part of the invention.

Referring to FIG. 1, the lid or cover 5 is 15½ inches across in the direction of the base 1b, and 14¾ inches from top to bottom, being beveled at 45 degree angles 5a and 5b at its upper corners. The outside surface is substantially flat. FIG. 5 shows the underside of the lid or cover 5.

The inner edge of the open receptacle 1 shown in FIG. 2, is surrounded by a groove, about 1 inch deep and ⅜ inch wide, bounded on the inner side by a flange 1x, which, in closed relation of the lid or cover 5, is accommodated in a groove inside the inner flange 5x of the lid 5. The latter flange is spaced-apart about ½ inch from the inner wall of 5, which surrounds it.

Centered opposite the handle on the inner wall of 1 are a pair of small notches 1m, each about ¾ inch wide for accommodating screw driver for prying open the lid, and spaced-apart about 1½ inches. (See FIG. 2). Centered between the two notches 1m is a small rectangular member 1r having a central elongated depression which bears against member 5y on the sidewall of the lid or cover 5, functioning as a latch. In addition, it is contemplated that there may be other depressions on the two adjacent sides which are constructed to mate with corresponding latch members on lid 5.

The lid 5 (shown in FIG. 5) is equipped with a first metal or plastic bracket comprising strip 9b, screwed or otherwise secured against the inner wall of 5. Spaced several inches from its opposite ends are a pair of slots through the thickness of the strip which accommodate and hold the handle ends of a pair of tools such as the conventional wrench 10, for opening and closing the cock of the oil tank to be drained, and another wrench 11 for loosening the engine oil filter. The shafts of the wrenches 10 and 11 are snap-fitted into slots provided by brackets 9c and 9d which are screwed or otherwise secured to the inner wall of the lid 5, spaced-apart from the bracket 9b. It will be understood that the receptacle for wrenches 10 and 11 can alternatively be formed integrally with the molding of the lid 5. Thus, the tools 10 and 11 are conveniently placed for use by the operator during the oil draining process, to open and close the oil drain cocks, and to loosen the engine oil filter.

Figure 4:
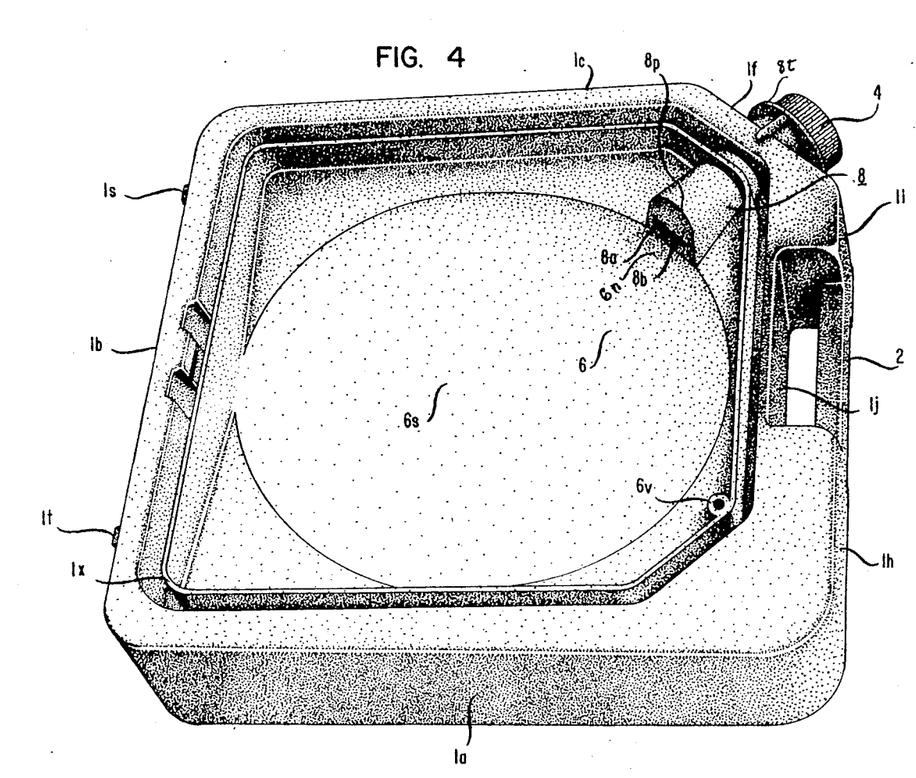
FIG. 4 is a perspective view of the waste oil drain receptacle of the present invention resting on the oil collection support base with the open drain pan viewed from the top.
Figure 6:
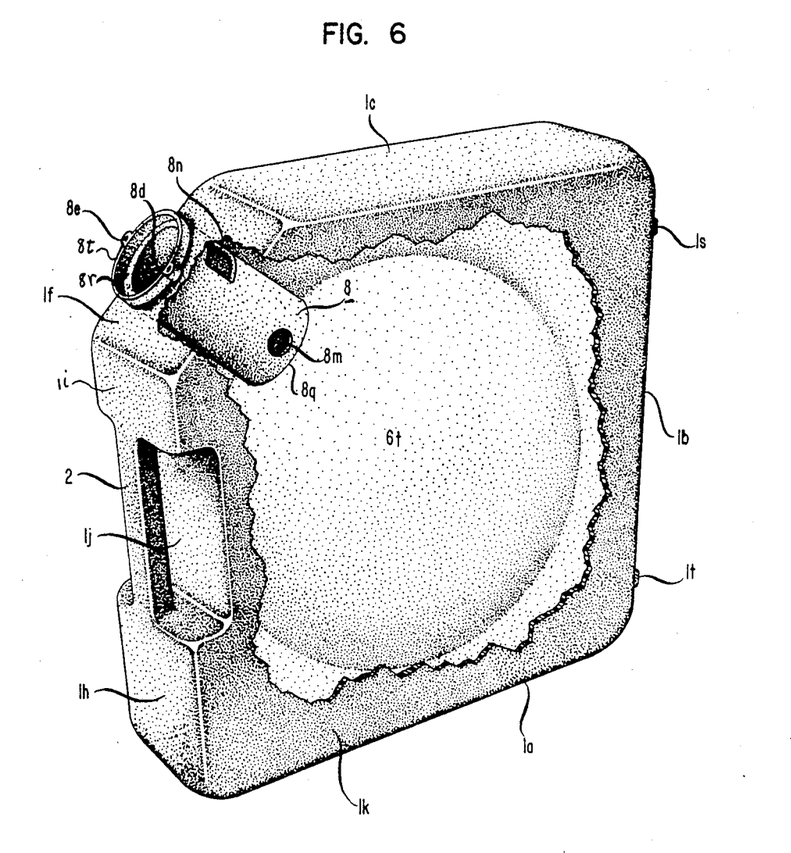
FIG. 6 is a perspective view of the side of the waste oil receptacle opposite that shown in FIGS. 1, 2 and 4, turned so that the handle is on one end and the pour-out opening is near the top. The sidewall has been broken away to show the storage container and the inner end of the connecting conduit.

FIG. 4 shows the receptacle 1, which is now seated on its broad collection support base, 1k, (FIG. 6) with the lid or cover 5 removed, revealing the drain pan 6 which is rectangular in outline and has centered therein a circular depressed portion 6s. As shown in FIG. 6, the collection support base 1k is bounded by panels 1a, 1b, 1c, 1f, 1i, 1j and 1k, which also support the drain pan 6, and serve as the walls of the internal storage container which will be described hereinafter.

Returning to FIG. 4, the flat central portion 6s is circular with a diameter of, say, 12¾ inches. When the receptacle 1 is placed with its flat collection support base 1k resting on a flat surface, the inner concavity 6s slopes downward forming a small angle with the horizontal plane, of, say, about 12 degrees, toward a nadir 6n at the corner in which is disposed the inner end 8p of the semi-cylindrical outlet conduit 8. The latter penetrates the sidewall at one corner of receptacle 1, being disposed so that the inner end 8p is substantially normal to the nadir area 6n of drain pan 6. The flat inner end of 8p is semicircular about 1⅝ inches in overall height, and 2-⅛ inches across. End 8p has a pair of adjacent openings 8a, 8b centered near the nadir of drain pan 6s, which openings are each about ½ inch wide and ⅜ inch deep, and curved on their lower edges. The conduit 8 is integrally formed with, and has its axis substantially normal to the beveled sidewall panel 1f, and extends through the sidewall 1f in an axial direction about 4¼ inches, terminating in an externally-direction rim 8t, having a pair of diametrically-opposite projecting screw fittings 8d and 8e. (See FIGS. 6 and 7). The latter accomodate matching screw holes 9a and 9b in a separate annular collar 9, (See FIGS. 8 and 9) which is about ¼ inch wide, except for the screw fitting 9a, which extends about ¼ inch in a radial direction beyond the edge of 9. It will be noted in FIG. 4 that there is also a vent 6v adjacent the beveled edge opposite the conduit 8. The vent 6v extends through the wall of the drain pan 6 and to the internal storage chamber 6t. The latter is constructed so that when lid 5 is open, vent 6v is open; and when the lid 5 is in place, vent 6v is sealed.

Figure 7:
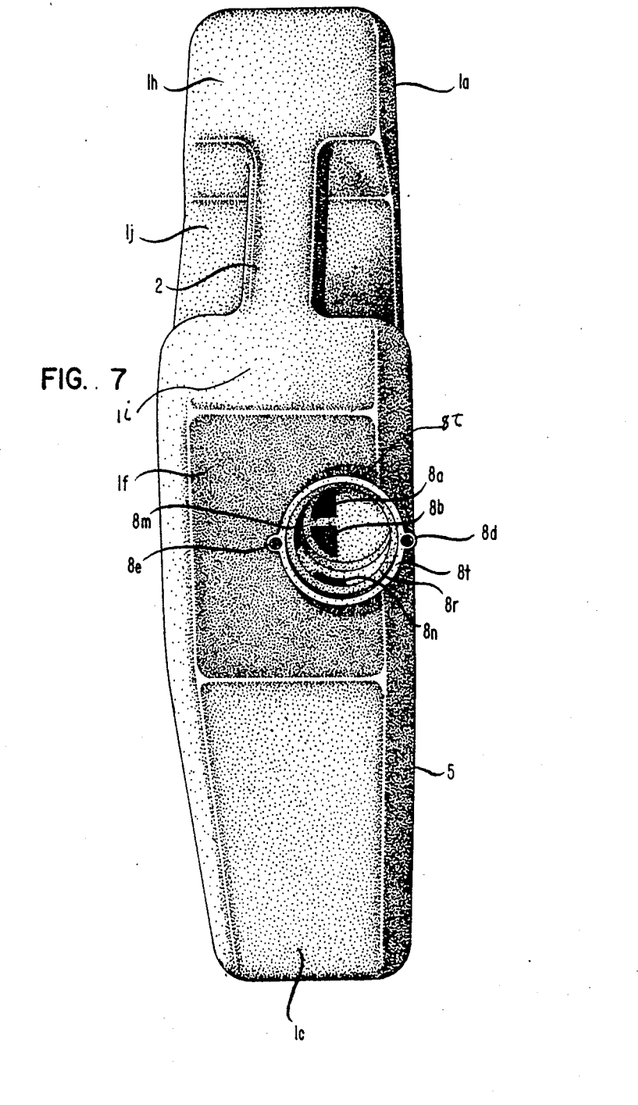
FIG. 7 is a perspective view, with the handle disposed on top, looking into the open connecting conduit from which the rotary valve has been removed.

The inner diameter of the rim 8t as viewed in FIG. 7 is, say, 2¼ inches, which diameter is stepped back about ¼ inch in an axial direction from the outer face of the rim, forming an annular internal flange 8r, about ¼ inch wide. The inner surface of conduit 8 continues inward at a substantially uniform diameter of about 1¾ inches beyond the flange 8r.

The shape of the conduit 8 can be better understood from a study of FIG. 6, which is a view from the underside of the flat collection support base 1k, with the wall partially broken away to show the interior of storage container 6t and the underside of the drain pan 6. The rotary spout/valve member 7 has been removed from its telescopic engagement with the interior of the cylindrical conduit 8, the underside of the latter being shown extending through the wall of beveled end panel 1f into the storage container 6t about ¼ inch below the under surface of the drain pan 6s.

Centered about ¼ inch in from the interior of end wall 8p, just behind and slightly below the semicircular openings 8a and 8b, (See FIG. 4) is a circular opening 8m about ¾ inch in diameter, which is disposed in what will be the lowest area of the conduit 8 when the receptacle 1 is resting on its collection support base 1k. Opening 8m (as shown in FIG. 6) is designed to provide drainage from the drain pan 6s, through the openings 8a, 8b into the oil storage container 6t, provided the rotary valve/spout member 7 is in open position, as will be described presently. (See FIG. 4).

In addition to the circular opening 8m, (as shown in FIG. 6) the fixed conduit 8 has a rectangular opening 8n, directly inside of the rim 8t, which opening is, say, ¾ inch in an axial direction, and about 1 inch wide in a circumferential direction. These openings are placed so that their center lines, as disposed in an axial direction in conduit 8, form a positive angle of about 45 degrees, as further shown in FIG. 7, which is an end-on view of receptacle 1, looking into the integrally-formed conduit 8 from outside, with the rotary valve/spout member 7 removed.

Figure 8:
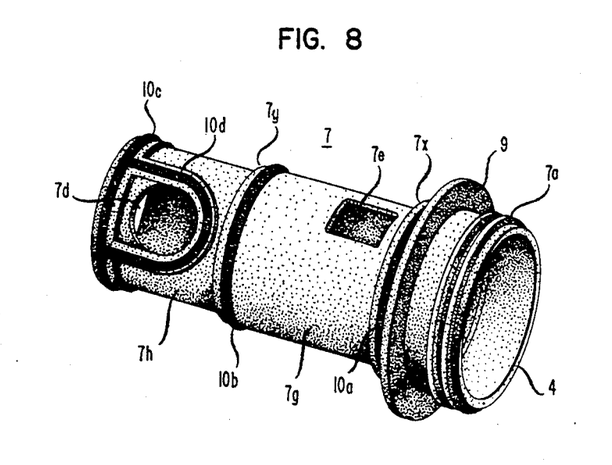
FIG. 8 is a perspective lengthwise view from the outer end of the combination rotary and spout valve member removed from the connecting conduit to the drain pan of the present invention.
Figure 9:
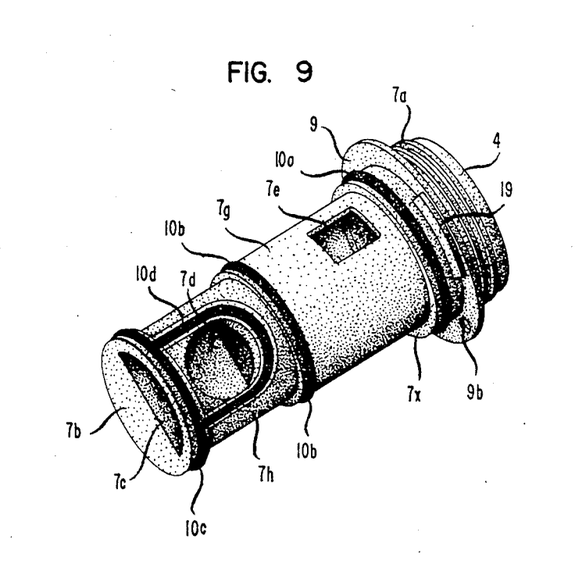
FIG. 9 is a perspective lengthwise showing, viewed from the inner end, of the combination rotary valve and spout of FIG. 8.
Figure 10:
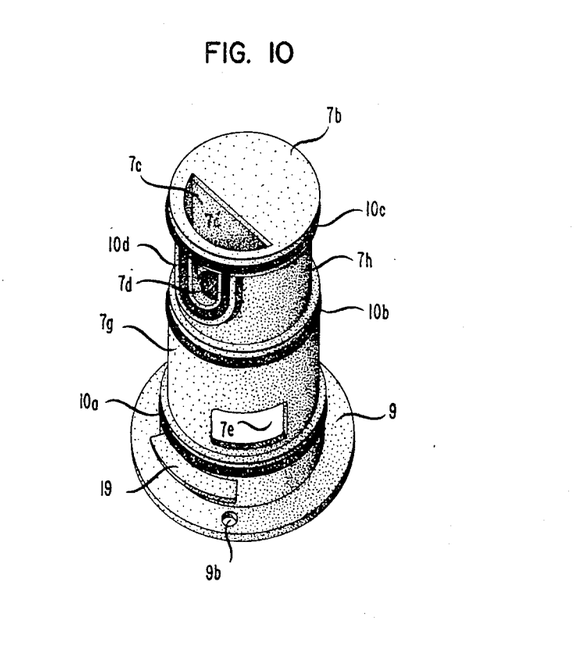
FIG. 10 shows the combination rotary valve and spout member of FIGS. 8 and 9, looking at the half-circular opening of the inner end.

FIGS. 8, 9 and 10 show the rotary valve/spout member 7, together with the fastening collar 9, removed from the cylindrical conduit 8, in which it is designed to fit telescopically, in position to be manually rotated about its long axis relative to the collar 9 which is screwed onto the rim 8t of the conduit 8. The collar 9 fits around the periphery of the rotary valve/spout member 7, about ¼ inch inside the external screw-threads of the spout portion 7a. The latter is constructed to seat and ride rotatably relative to collar 9, on the internal flange 8r, the screw hole 9b being secured to the fixed screw hole 8d, and screw hole 9a, to 8e.

The rotary valve/spout member 7 is in the form of a hollow cylinder, preferably of rigid plastic material such as, for example, high density polypropylene having a wall thickness of, say, 1/16 inch, but may alternatively be formed of any other rigid solid material. In the presently described example, it has an axial length of 4¾ inches from the open screw-threaded spout 7a to the partially closed inner end 7b.

The spout portion 7a has an outer diameter, except for screw-threads, of about 2 inches, and an inner diameter of 1⅞ inches, which extends uniformly for 9/16 inch internally to an internal annular collar which is stepped back to a diameter of about 1⅝ inches for an axial distance of 3/16 inch, and is again stepped back to an inner diameter of about 1½ inches.

Figure 11:
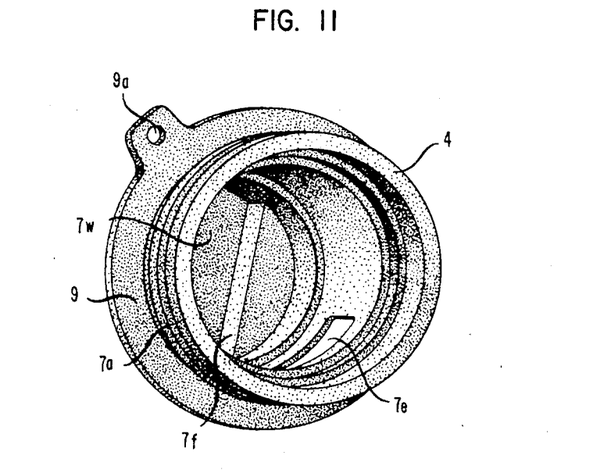
FIG. 11 shows the rotary valve of FIG. 10, looking into the spout.

Referring to FIG. 11, about 3/16 inch in from this second step is a window 7e, extending ¾ inch in an axial direction and about 1 inch around the periphery. The inner diameter in the area including the window 7e remains uniform for about 1½ inches along the axis, to a plane at which the inner diameter is again reduced to about 1¼ inches. This internal diameter remains uniform for an axial distance of about ¼ inch to a stepped-barrier 7f forming a wall normal to the axis, bifurcating the inner chamber. The internal semi-cylindrical chamber extends an axial distance of about one inch, terminating against the closed inner face of the end plate 7b. The latter has a semicircular opening 7c which opens into a corresponding semi-cylindrical chamber on the opposite side of stepped-barrier 7f, which is thereby closed off from axial passage through the valve member 7 in the direction of the spout 7a.

Looking at FIGS. 8 and 9 at the external shape of valve/spout member 7, the screw-threads extend approximately ½ inch in from the end of spout 7a, which is roughly 2 inches in outer diameter. Conforming to a cross-sectional plane ¾ inch in from the end of spout 7a is a semi-annular flange 19, which projects out ¼ inch, and is 1/16 inch thick, and extends through an arc of about 60 degrees around the periphery. The center line of the flange 19 is substantially aligned, in the axial direction of cylindrical valve 7, with the center of the semicircular barrier 7f, and forms an angle of about 45 degrees with the axially-directed center line of the window 7e.

The 2 inch external diameter of the spout 7a remains substantially uniform for about ¼ inch in an axial direction toward the inner end from the flange 19, except that it contains an annular groove in which is interposed a gasket 10a of natural or synthetic rubber. The spout portion 7a terminates toward the inner end in an annular shoulder 7x about 3/16 inch wide which abuts a cylindrical section 7g having an external diameter of about 1⅜ inches for an axial distance of about 1-15/16 inches. this section terminates at its inner end in another annular shoulder 7y, about ⅛ inch wide, adjacent to which is a peripheral groove accommodating a synthetic or natural rubber ring 10b. The inner end portion 7h of the cylindrical valve member 7 has an external diameter of about 1⅜ inches, and extends 1¼ inches in an axial direction to a peripheral end flange projecting out, say, ⅛ inch, and extending ¼ inch in an axial direction, and having a groove which accommodates a natural or synthetic rubber gasket 10c. The inner end of the valve 7 has a closed semicircular portion 7b, having a diameter of, say, 1⅜ inches, which extends through an arc of, say, 300 degrees, forming by its inner wall the closure of the internal semicircular chamber formed by the stepped-barrier 7f. The semicircular opening 7c, completes the circle through an arc of, say, 60 degrees, which opens into a semi-cylindrical chamber 7i formed on the other side of the stepped-barrier 7f, and separated from the internal chamber by stepped-barrier 7f.

A round lateral opening 7d, say, ¾ inch in diameter, is formed in the cylindrical sidewall of 7h, which is axially aligned with the center of the opening 7c and the open semi-cylindrical chamber 7i. The opening 7d is surrounded by a U-shaped, grooved flange, in which is seated a U-shaped gasket 10d the open end of which terminates on the annular gasket 10c. It will be understood that these two gaskets could be interconnected in actual practice.

Operation of the Oil Drain Receptacle of the Present Invention Including the Rotary Valve/Spout Member Assume that the valve/spout member 7 has been interposed into the conduit 8 so that the external flange 7x of the latter engages and is positioned to ride rotatably against the internal flange 8r of the fixed cylindrical sleeve 8. (See FIG. 6). In the carrying position, as shown in FIG. 1, the rotary valve/spout member 7 has been rotated in a clockwise direction as far as possible, so that inner end of the flange 19 engages the screw fitting 8d, which functions as a stop. The top 4 is then in its completely closed position, from which it cannot be readily unscrewed and removed.

Figure 12A:
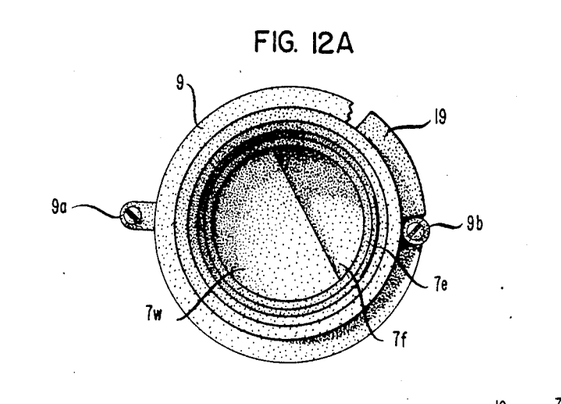
FIG. 12A is a view looking into the spout.
Figure 12B:
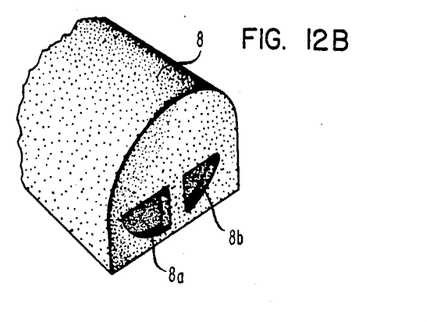
FIG. 12B is a view of the closed inner end of the conduit.
Figure 12C:
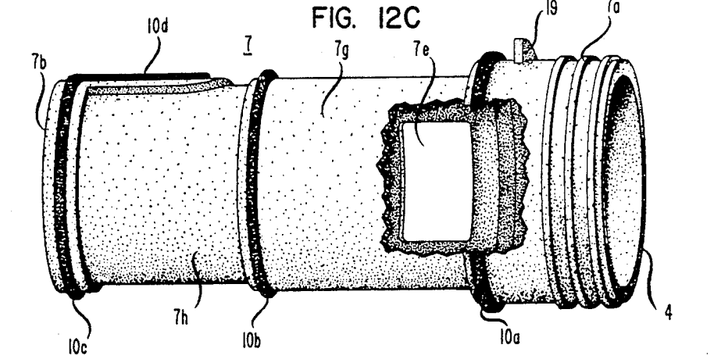
FIG. 12C is a lateral perspective with the sidewall partially broken away of the cylindrical valve/spout, all orifices into the storage container being closed.

FIG. 12A is a view looking into the valve/spout member 7, in carrying position of receptacle 1, as shown in FIG. 1. The stepped-barrier 7f is positioned so that the closed semicircular chamber 7w extends to the inner end of the conduit 8 closing the vents 8a and 8b which lead from the oil drain pan 6s; and simultaneously the valve member 7 is rotated to close the round opening 8m which leads from the conduit 8 into the storage tank 6t, and to close the rectangular opening 8n disposed near the outer end of 8, which provides pour-out from the storage container.

Figure 13A:
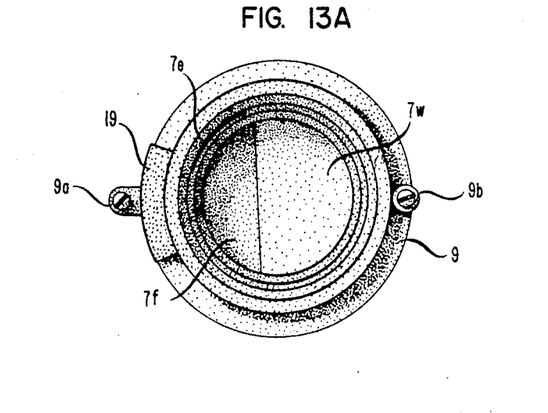
FIG. 13A is the view looking into the spout.
Figure 13B:
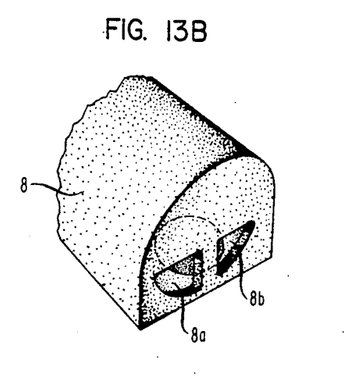
FIG. 13B is a view looking into the openings of the conduit leading into the storage container.
Figure 13C:
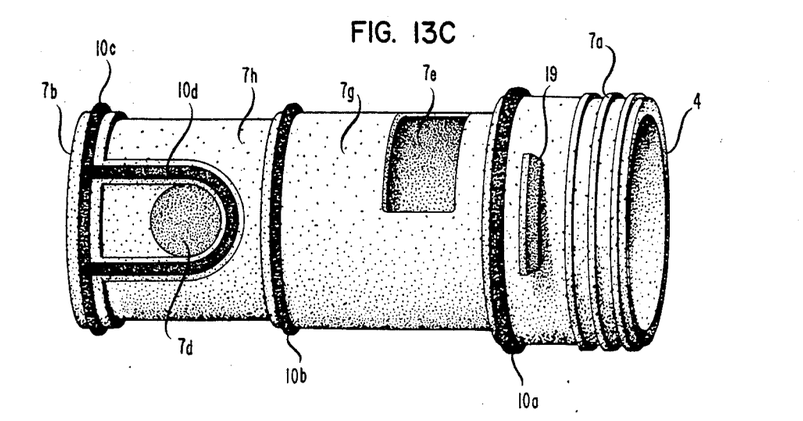
FIG. 13C is a lateral view of the rotary valve/spout showing the position of the inner opening leading from the drain pan to the storage tank, and the closed lateral vent leading from the storage tank.

In order to prepare the receptacle 1 to receive oil drained out from the oil cocks of a serviced vehicle, the rotary valve/spout member 7 is turned in a counter-clockwise direction from the position shown in FIG. 12A, to the position shown in FIG. 13A in which the flange member 19 is centered in front of the screw fitting 9a. In this position, the stepped-barrier 7f is placed so that the closed chamber 7w and the rectangular opening 7e are rotated about 130 degrees in a counterclockwise direction. The receptacle 1 is then placed on its broad collection support base with the lid 5 removed, and the drain pan 6s facing upward as shown in FIG. 4. In this position, the closed semi-cylindrical disk 7b has been rotated to uncover the vents 8a and 8b; and the opening 7d in the chamber 7w is moved into a position conforming to the opening 8m leading into the storage chamber. Thus, as indicated in FIG. 13B, oil from drain pan 6s flows through open vents 8a and 8b, and the superposed openings 7d and 8m into the storage chamber 6t. Oil is prevented from flowing out along the axis of valve member 7 in the direction of the spout 7a by the stepped-barrier 7f, and from flowing out from the storage chamber through 7e, which, in this position, is closed against the inner wall of conduit 8. The opening 8m is positioned in the fixed conduit 8 relative to storage chamber 6t, so that the oil will not reach the opening, in either the oil drain position or the carrying position of receptacle 1, until chamber 6t is full of oil.

Figure 14A:
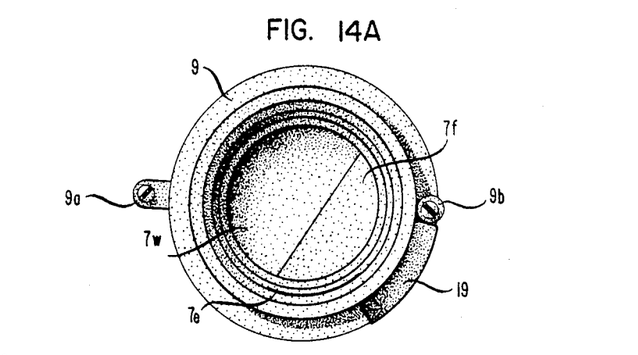
FIG. 14A is a view looking into the spout.

If it is wished to pour out oil from the storage chamber, the receptacle 1 is again returned to the position shown in FIG. 1, the lid 5 replaced, and the rotary valve member 7 is moved in a counterclockwise direction until the flange 19 engages the screw-fitting 9b, as shown in FIG. 14A, on the opposite end from that shown in FIG. 12A. Continuing the counterclockwise screwing motion, the operator then unscrews the cap 4, and removes the same from the pour-spout rim 7a. Through all other operations, the cap 7 remains screwed in place.

Figure 14B:
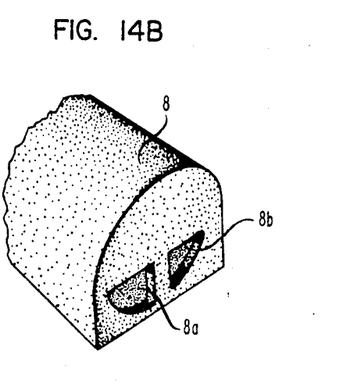
FIG. 14B is the view of the closed inner end of the conduit.
Figure 14C:
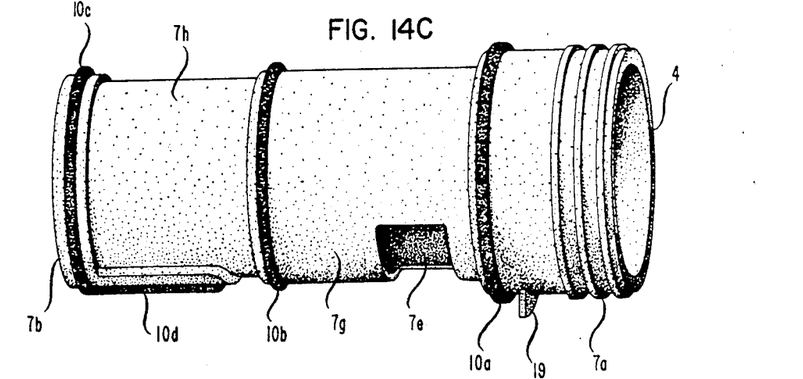
FIG. 14C is a lateral perspective view of the cylindrical valve/spout member showing the open vent conforming to the conduit opening for pour-out from the storage container.

In this position, the stepped-barrier 7f is rotated through an angle of about 150 degrees, again closing the openings 8a and 8b from the drain pan 6s as shown in FIG. 14B, and moving the openings 7d and 8m out of superposition. At the same time, the rectangular opening 7e is superposed on the rectangular opening 8m, so that oil may be poured out from the storage container, and through the spout 7a.

If it is desired to close the vents and carry the receptacle 1, the rotary valve/spout member 7 is again returned to the position shown in FIG. 12A. It will be understood that the present invention is not limited to the specific form or dimensions of the present illustrative example, but only by the scope of the appended claims.

What I claim is:

1. A kit for collecting and storing oil and other liquids which comprisese in combination:
   a receptacle having a substantially flat collection support base extended in one plane, said receptacle having enclosing sidewalls including a narrower substantially flat resting base extended in a plane substantially normal to said collection support base;
   a drain pan supported by said enclosing sidewalls and seated in said receptacle in a plane spaced-apart from said collection support base, said collecting pan forming with said sidewalls and said substantially flat collection support base an internal storage chamber, the external surface of said collecting pan being shaped to include an inwardly-directed concavity which slopes downward toward an area of greatest concavity adjacent one sidewall when said receptacle is resting on said substantially flat collection support base;

said receptacle including three-way rotary valve means communicating between said drain pan, said storage container, and an external spout portion for remotely controlling the flow of oil between said drain pan, said storage container, and said external spout portion;

in a first carrying position: said valve means simultaneously closed between said drain pan and said storage container, and between said storage container and said external spout portion;

in a second liquid collecting postion: said valve means open between said drain pan and said storage container, and closed between said storage container and said external spout portion, and in a third pour-out position: said valve means closed between said drain pan and said storage container, and open between said storage container and said external spout portion.

2. A kit in accordance with claim 1 wherein said receptacle includes a lid constructed to close said collecting pan when not in said drain position.

3. A kit in accordance with claim 1 wherein the combination includes one or more tool holders attached to the body or lid of the said receptacle.

4. A kit in accordance with claim 3 wherein said tool holders are fitted to the underside of said lid.

5. The combination in accordance with claim 1 wherein said valve means comprises a fixed conduit extending from said area of greatest concavity in said collecting pan, transversely through one of said enclosing sidewalls to an external pour-out rim;

said conduit closed at the inner end except for at least one first opening adjacent said inner end which leads from said area of greatest concavity in said drain pan into said storage chamber, and said conduit having a second external opening leading out from said storage container adjacent said pour-out rim;

a combination rotary valve/spout member disposed longitudinally in said conduit being constructed to be rotated through three positions including:

a first carrying position in which said at least one first conduit opening from said drain pan into said storage container, and said second conduit opening leading out from said storage container are simultaneously closed;

a second liquid collecting position in which said at least one first conduit opening from said drain pan into said storage container is open, and said second conduit opening leading out from said storage container is simultaneously closed; and a third pour-out position in which said at least one conduit opening from said drain pan into said storage container is closed, and said second conduit opening leading out from said storage container is simultaneously open.

6. The combination in accordance with claim 2 wherein said storage chamber includes a vent opening into said storage container which is automatically opened when said lid is removed, and closed when said lid is in place.

7. A kit for collecting and storing oil and other liquids which comprises in combination:

a receptacle having a substantially flat collection support base extended in one plane, said receptacle having enclosing sidewalls including a narrower substantially flat resting base extended in a plane substantially normal to said collection support base;

a drain pan supported by said enclosing sidewalls and seated in said receptacle in a plane spaced-apart from said collection support base, said collecting pan forming with said sidewalls and said substantially flat collection support base an internal storage chamber, the external surface of said collecting pan being shaped to include an inwardly-directed concavity which slopes downward toward an area of greatest concavity when said receptacle is resting on said substantially flat collection support base;

said receptacle including an external spout providing a passage through the wall of said internal storage chamber;

said receptacle including valve means communicating between the area of greatest concavity of said drain pan, said storage container, and said external spout portion for controlling the flow of oil between said drain pan, said storage container, and said external spout;

wherein said valve means is a rotary valve disposed to rotate in a fixed sleeve interposed in a wall of said container between said drain pan, said storage container and said external spout portion.

* * * * *